United States Patent [19]

Huang

[11] Patent Number: 5,542,449
[45] Date of Patent: Aug. 6, 1996

[54] SINGLE-OUTLET HOT/COLD WATER FAUCET WITH A WATER TEMPERATURE DISPLAY DEVICE

[76] Inventor: Chien-Ta Huang, No. 36, Cherz Road, Hsin Tien City, Taipei Hsien, Taiwan

[21] Appl. No.: 274,647

[22] Filed: Jul. 13, 1994

[51] Int. Cl.⁶ ............................ F16K 37/00; H01H 35/00
[52] U.S. Cl. .......................... 137/551; 137/163; 137/170
[58] Field of Search .................................. 374/163, 170; 137/551, 625.4

[56] References Cited

U.S. PATENT DOCUMENTS

| | | | |
|---|---|---|---|
| 4,575,262 | 3/1981 | Andersen | 137/551 |
| 4,682,626 | 7/1987 | Bergmann | 137/551 |
| 4,968,152 | 11/1990 | Bergmann | 137/551 |
| 5,320,137 | 6/1994 | Huang | 137/551 |

*Primary Examiner*—A. Michael Chambers
*Attorney, Agent, or Firm*—Bucknam and Archer

[57] ABSTRACT

A single-outlet hot/cold water faucet of the type having a handle, a valve connected to the handle by a connecting plate and a lever and moved to open or close the water outlet, a revolving shaft turned by the handle to regulate the temperature of water in the mixing chamber, and a temperature detection and display device controlled by the handle to detect and show the temperature of water in the mixing chamber, wherein the temperature detection and display device includes a liquid crystal display mounted within a top chamber on the handle and covered by a transparent cap, a battery, a switch controlled by the handle to connect the battery to the liquid crystal display, and a temperature detecting probe connected to the liquid crystal display by a temperature detecting wire and inserted through the revolving shaft and disposed in a hole on the bottom extension rod of the connecting plate to detect the temperature of water in the mixing chamber.

2 Claims, 3 Drawing Sheets

SINGLE-OUTLET HOT/COLD WATER FAUCET WITH A WATER TEMPERATURE DISPLAY DEVICE

BACKGROUND OF THE INVENTION

The present invention relates to faucets, and relates more particularly to a faucet water temperature display device for automatically indicate the water temperature of a single-outlet hot/cold water faucet.

Various types of water faucets have been disclosed for regulating the flow rate of hot/cold water, and have appeared on the market. Nowadays, single-outlet hot/cold water faucets are intensively used to replace conventional dual-outlet hot/cold water faucets. A single-outlet hot/cold water faucet, as shown in FIG. 1, is generally comprised of a handle (10), a valve (50) connected to the handle (10) by a connecting plate (40) and a lever (20) and moved to open or close the water outlet, a water seal ring (60) mounted on the valve (50), a revolving shaft (30) turned by the handle (10) to regulate the temperature of water in the mixing chamber. This structure of faucet is functional. When water temperature is regulated, the user still cannot know the actual temperature of water in the mixing chamber. In order to know the actual temperature of water in the mixing chamber, one tends to open the faucet and touch the outlet flow of hot water with the hand. However, one's hand may be hurt when touches the outlet flow of hot water. In order to eliminate this problem, faucets with water temperature detection and display means are invented. Exemplars of faucets with water temperature detection and display means are seen in U.S. Pat. Nos. 4,682,626; 4,968,152. However, these faucets with water temperature detection and display means are complicated and expensive, and therefore they are still not popularly accepted.

SUMMARY OF THE INVENTION

The present invention has been accomplished under the circumstances in view. It is therefore the principal object of the present invention to provide a single-outlet hot/cold water faucet which has a temperature detection and display device for detecting and showing the temperature of water in the mixing chamber. It is still another object of the present invention to provide a single-outlet hot/cold water faucet having a temperature detection and display device which automatically detects and show the temperature of water in the mixing chamber when the handle is lifted to open the faucet. It is still another object of the present invention to provide a single-Outlet hot/cold water faucet having a temperature detection and display device which is simple in structure and inexpensive to manufacture.

DETAILED DESCRIPTION OF THE PREFERRED EMBODIMENT

Figure 1:
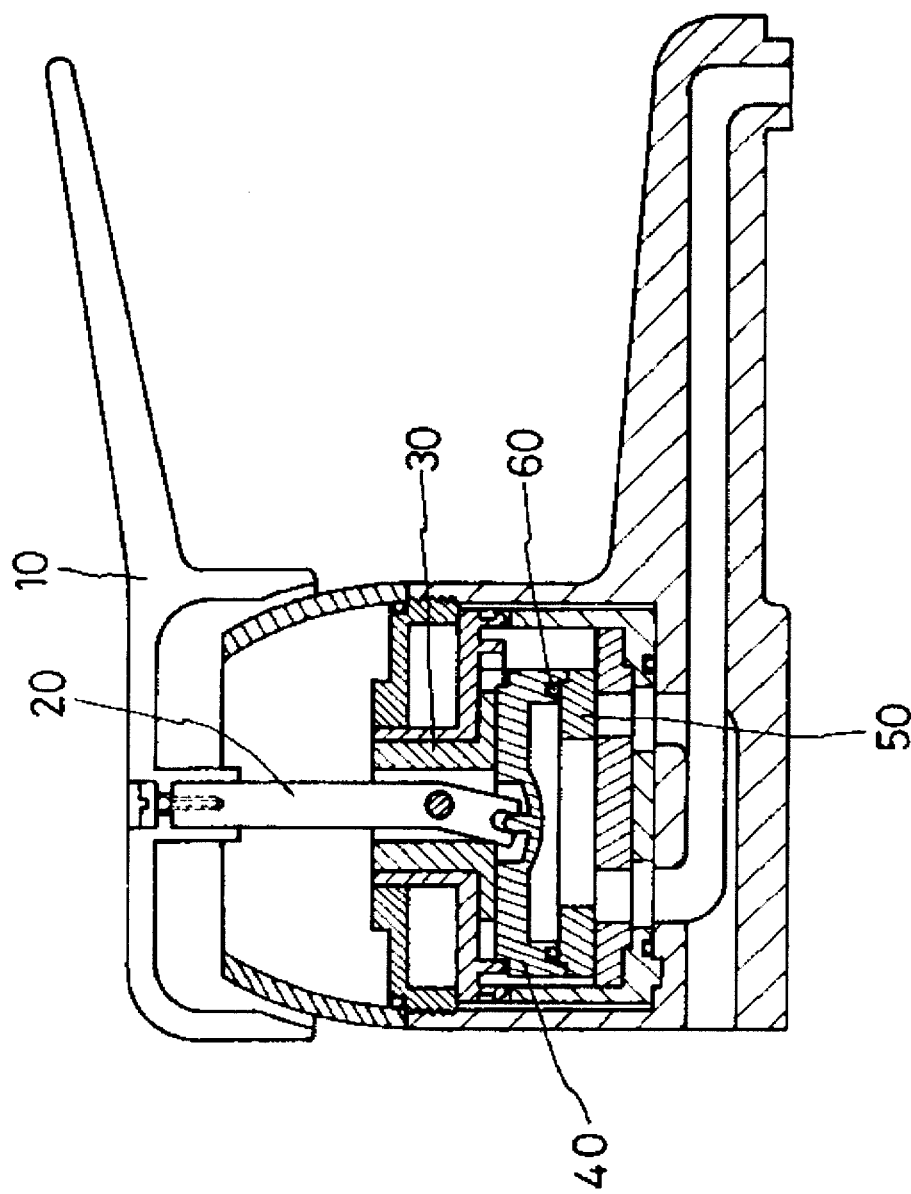
FIG. 1 is a sectional elevation of a single-outlet hot/cold water faucet according to the prior art.
Figure 2B:
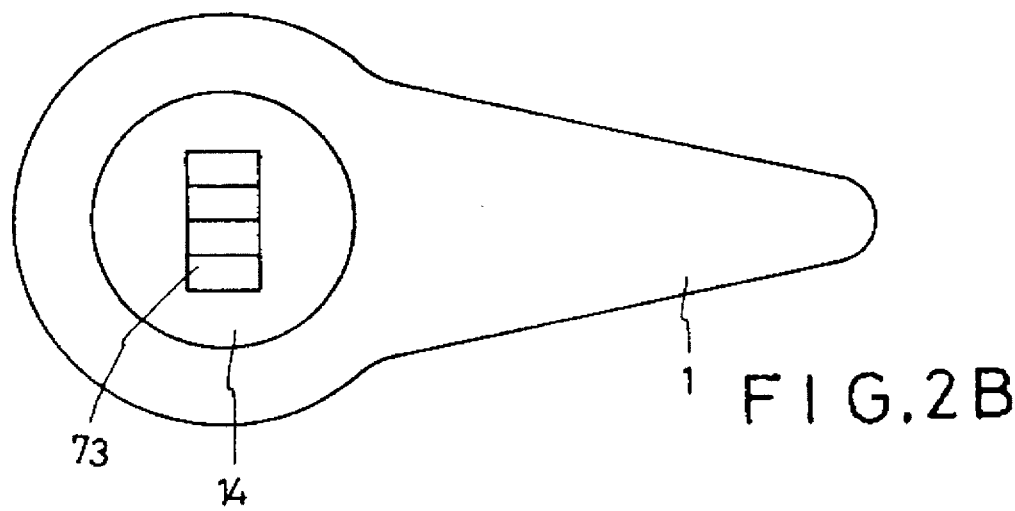
FIG. 2 is a sectional elevation of a single-outlet hot/cold water faucet according to the present invention when closed.
Figure 2A:
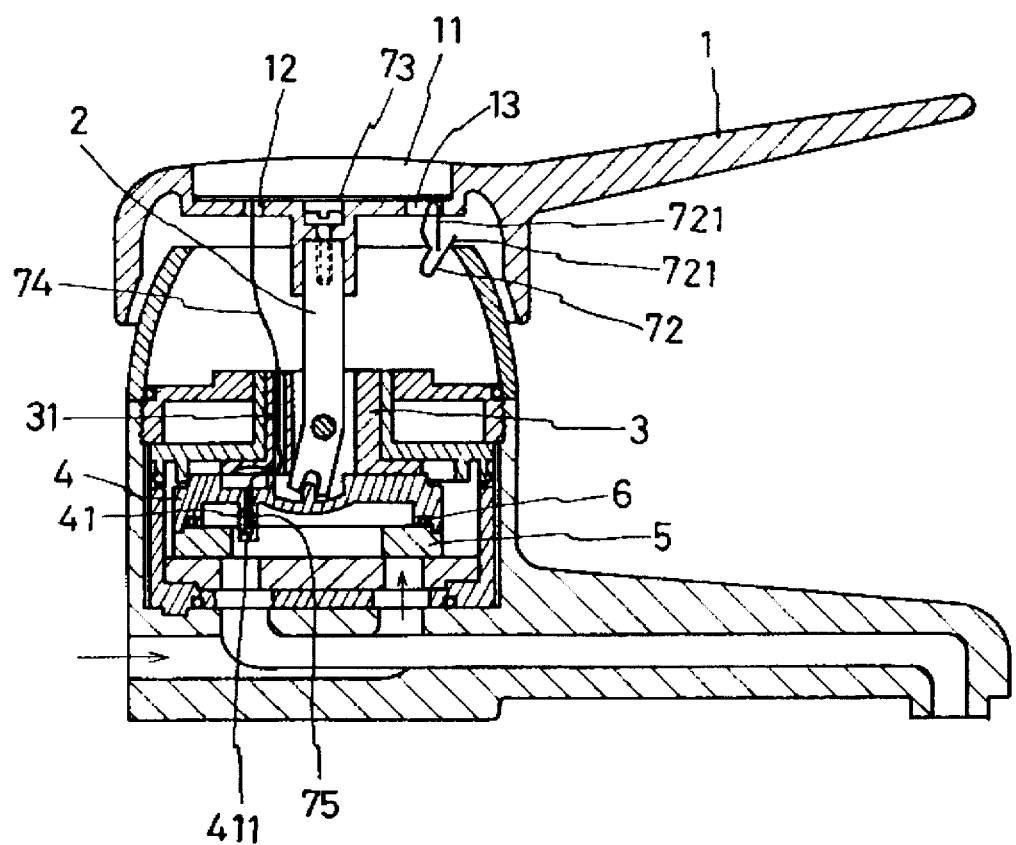

Referring to FIG. 2, the single-outlet hot/cold water faucet comprises a handle 1, control lever 2, a hollow revolving shaft 3, a connecting plate 4, a valve body 5, a rubber ring 6, and a temperature detection and display device 7.

The handle 1 comprises a top chamber 11 at one end covered by a transparent cap 14, a wire hole 12 and a switch hole 13 respectively communicated with the chamber 11 at the bottom. The control lever 2 has a top end connected to the handle 1, a bottom end inserted through the hollow revolving shaft 3 and connected to the connecting plate 4. The hollow revolving shaft 3 has a vertical through hole 31. The connecting plate 4 comprises a bottom extension rod 41 inserted into the mixing chamber of the faucet, and a through hole 411 through the longitudinal center of the extension rod 41. The valve body 5 and the rubber ring 6 are fastened to the connecting plate 4 at the bottom and moved to regulate the water flow rate through the water outlet of the faucet. The temperature detection and display device 7 comprises a battery 71 (not shown) mounted within the switch hole 13, a switch 72 connected to the battery 71, a liquid crystal display 73 mounted within the chamber 11, a temperature detecting probe 74 received in the through hole 411 on the bottom extension rod 41, a temperature detecting wire 74 having one end connected to the temperature detecting probe 74 and an opposite end inserted through the wire hole 12 and connected to the liquid crystal display 73.

Figure 3A:
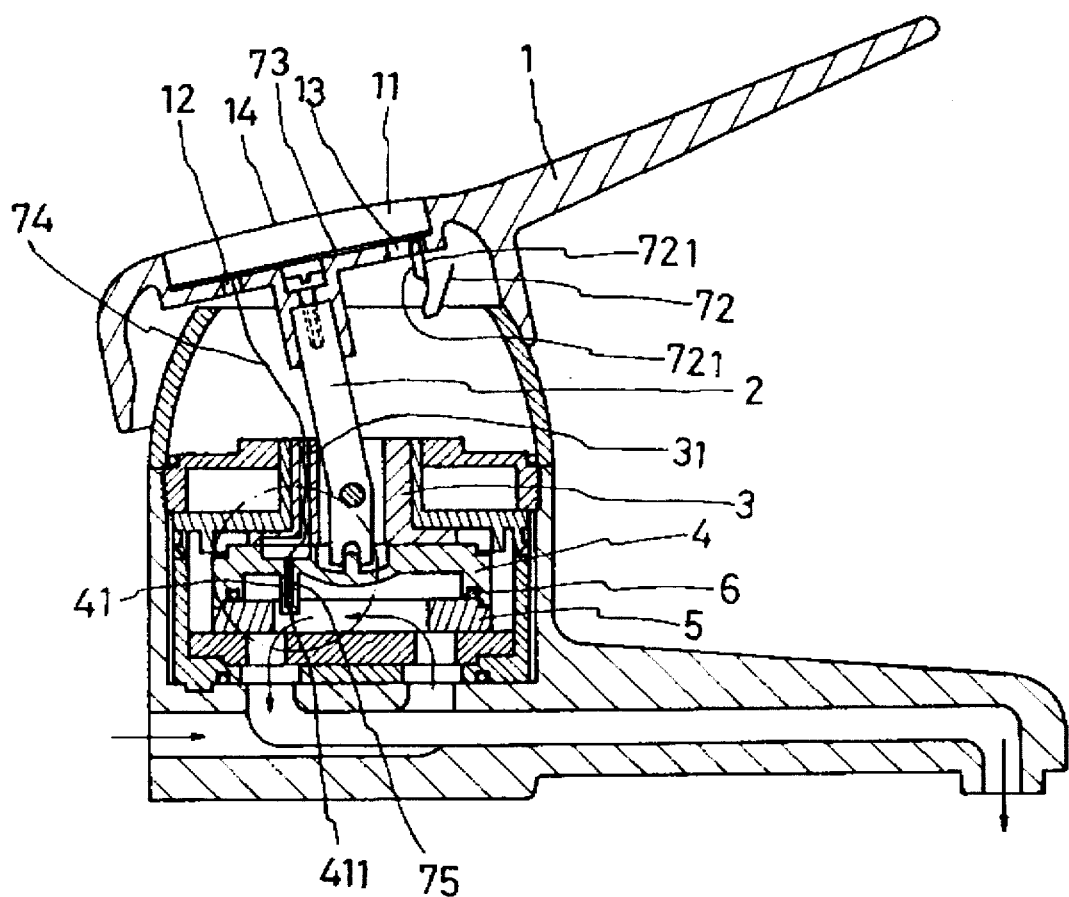
FIG. 3 is similar to FIG. 2 but showing the faucet opened.
Figure 3B:
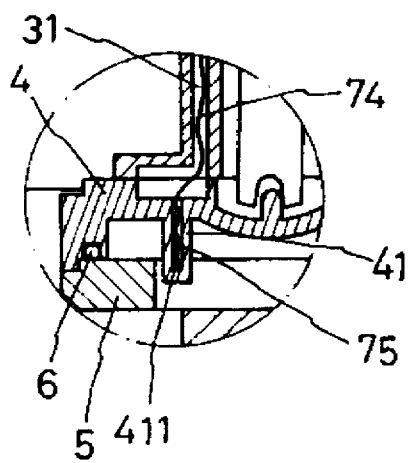
Figure 4:
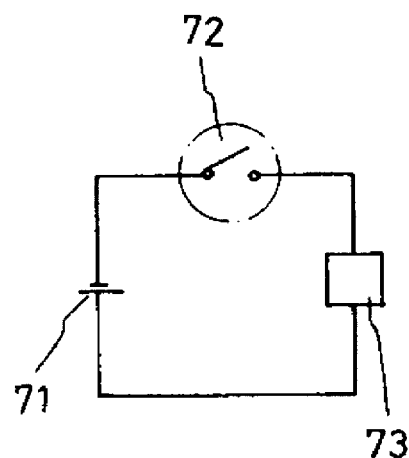
FIG. 4 is a circuit diagram of a temperature detection and display device according to the present invention.

Referring to FIGS. 3 and 4, the switch 72 comprises two opposite contacts 721, which are electrically connected when the handle 1 is pulled upwards to open the faucet, or electrically disconnected when the handle 1 is pressed down to close the faucet.

Referring to FIG. 3 again, when the handle 1 is pulled upwards to open the faucet, the switch 72 is turned on to detect the temperature of water in the mixing chamber by the temperature detecting probe 75 and to show the detected result through the liquid crystal display 73. When the revolving shaft 3 is turned by the handle 1, the temperature of mixed water is regulated. If the handle 1 is pressed down, the faucet is closed and the switch 72 is turned off, and therefore the temperature detection and display device 7 does no work.

While only one embodiment of the present invention has been shown and described, it will be understood that various modifications and changes could be made without departing from the spirit and scope of the invention.

What is claimed is:

1. A single-outlet hot/cold water faucet comprised of a mixing chamber, a water outlet, a handle, a revolving shaft turned by said handle to regulate the temperature of water in said mixing chamber, a connecting plate, a control lever connected between said connecting plate and said handle, a valve with a rubber seal ring fastened to said connecting plate and lifted or lowered by said handle to open or close said water outlet, and a temperature detection and display device to detect and show the temperature of water in said mixing chamber, wherein said handle comprises a top chamber covered with a transparent cap, a switch hole and a wire hole respectively communicated with said top chamber at the bottom; said connecting plate comprises a bottom extension rod extended into said mixing chamber and a through hole through said bottom extension rod; said revolving shaft comprises a through hole communicated between the through hole of said connecting plate and said wire hole of said handle; said temperature detection and display device comprises a battery and a switch mounted within said switch hole, said switch being switched on when said handle is lifted to open said water outlet or switched off when said handle is pressed to close said water outlet, a liquid crystal display mounted within said top chamber and connected to said battery through said switch and having a temperature detecting wire with a probe at the end inserted through said wire hole and the through holes on said revolving shaft and said connecting plate to detect the temperature of water in said mixing chamber.

2. The single-outlet hot/cold water faucet of claim 1 wherein said connecting plate is made of heat conductive metal.

* * * * *